United States Patent Office 3,560,406
Patented Feb. 2, 1971

3,560,406
PROCESS AND CATALYST FOR MANUFACTURING CYCLIC KETONES BY CATALYTIC DEHYDROGENATION OF CYCLIC ALCOHOLS
Bernard Juguin, Rueil-Malmaison, France, assignor to Institut Francais du Petrole, des Carburants et Lubrifiants, Rueil-Malmaison, France
No Drawing. Filed Nov. 15, 1967, Ser. No. 683,120
Claims priority, application France, Nov. 28, 1966, 85,302
Int. Cl. B01j 11/32
U.S. Cl. 252—457        15 Claims

ABSTRACT OF THE DISCLOSURE

Cyclic ketones with high specificity and increased yields are produced by the catalytic dehydrogenation of cyclic alcohols. The catalyst utilized for the dehydrogenation process comprises silica, zinc oxide, at least one oxide of an alkaline earth metal and at least one basic compound of an alkaline metal.

---

This invention relates to an improved process for manufacturing cyclic ketones such as cyclohexanone by catalytic dehydrogenation of corresponding alcohols, for example cyclohexanol (which may be manufactured by oxidation of cyclohexane or by any other process). More particularly this invention relates to a process where the catalyst is manufactured by depositing zinc oxide, an alkaline-earth metal oxide and an alkaline compound over an inert carrier consisting of balls, granules or other agglomerates of silica, the chemical ocmposition and the textural characteristics are well determined.

It is known that cyclohexanone is a very important basic compound for the manufacture of polyamides and that the skilled people are looking for an improvement in the economics of its manufacture.

It is known to carry out such a dehydrogenation by passing cyclohexanol over a catalyst containing zinc oxide, or a mixture of zinc oxide and zinc carbonate with alkaline or alkaline-earth metal compounds, such as calcium or magnesium oxides or carbonates; the reaction temperature is usually between 325 and 475° C. and the pressure between 0.1 and 10 kg./cm.$^2$.

The reaction is optionally carried out with added hydrogen which is preferably used in an amount of 0.5 to 5 moles per mole of cyclohexanol.

It does not appear that the following results have been obtained simultaneously up to now:

A high conversion rate allowing the use of high rates of reactants.

A selective conversion thereby avoiding the formation of dehydration products, condensation products and, above all, phenol; it is known that phenol is quite detrimental in the further manufacture of caprolactam obtained from cyclohexanone.

A high duration of life allowing the use of the catalyst on the industrial scale.

A great ease of regeneration of the catalyst by combustion of carbon deposits.

A satisfactory solution has been brought to these problems by the present invention.

This new process is based on the use of a catalyst containing silica, zinc oxide, at least one oxide of an alkaline-earth metal and at least one compound of an alkaline metal which imparts to the catalyst a basic reaction.

Preferably the catalyst is obtained by depositing the active elements (zinc oxide and oxide of alkaline-earth metal) or their precursors (convertible into these active elements) on a carrier consisting of a preferably activated silica (i.e. previously heated up to a temperature between about 300 and 800° C.) containing about 0.2 to 5%, preferably 0.4 to 2% by weight of a basic compound of an alkaline metal, the weight being expressed as $M_2O$ where M is the alkaline metal.

There will be advantageously chosen a silica having a specific surface higher than 15 m.$^2$/g. and for example between 15 and 300 m.$^2$/g. (preferably 25–150 m.$^2$/g.). Preferably the carrier will have a total porous volume of 0.8–1.3 cm.$^3$/g., usually at least 80% of this porous volume corresponding to pores with an average diameter between 100 and 500 angstroms.

The ZnO content of the obtained catalyst will be most advantageously between 8 and 25% by weight (preferably 15–20%), whereas the content of alkaline-earth metal oxide will be advantageously between 15 and 50% of the weight of ZnO (more preferably 25–40%). These figures are optimal values; satisfactory results may also be obtained with amounts of 2–50% by weight of ZnO and 0.5–30% by weight of alkaline-earth metal oxide, with respect to the total weight of catalyst.

As a rule the catalyst will contain 0.2–5% by weight of the basic compound of the alkaline metal, expressed as $M_2O$, preferably 0.4–2%. It is however preferred that this compound be present in the carrier, before manufacturing the catalyst.

If the carrier contains less than 0.4% and, of course, less than 0.2% of these metals, the parasitic reaction of dehydration of cyclohexanol is improved, whereas beyond 2%, and of course beyond 5%, the condensation reactions of the cyclohexanone are troublesome.

It is essential that the alkaline metal be in the form of a free base. The presence of stable salts of alkaline metals, particularly the sulfate and the chloride, is detrimental and increases the intensity of the parasitic reaction of dehydration.

ZnO and the alkaline-earth metal oxide (preferably calcium oxide) will be preferably deposited on the silica by means of solutions containing the oxides, or solutions of zinc and alkaline-earth metal inorganic or organic compounds, these compounds being able to decompose under the manufacture or use conditions of the catalyst, thus forming the corresponding oxides. There will be named by way of non-limitative examples the solutions of zinc nitrate, acetate, tartrate, lactate, citrate, laurate and oleate, and the solutions of alkaline-earth metal nitrate, oleate, laurate, acetic, tartrate, lactate or citrate, particularly those of magnesium, calcium, barium and strontium.

These solutions are usually acid; in order to retain a good selectivity, it is preferable to neutralize this acidity by further addition to the catalyst of compounds having a basic reaction or able to decompose under the manufacture or use conditions of the catalyst to liberate basic compounds.

As examples of basic compounds of alkaline metals which may be present in the silica or introduced as neutralizing agents, the alkaline metal oxides and hydroxides will be named, as well as the carbonates and other salts of weak acids with these metals, for example potassium oxide, sodium hydroxide, potassium hydroxide, lithium hydroxide, sodium carbonate, potassium bicarbonate, rubidium carbonate and cesium carbonate.

The amount by weight (expressed as alkaline metal hydroxide) of the additional alkaline metal compound added at this stage of the process will be advantageously between 0.05 and 0.2 times the amount by weight of ZnO, preferably between 0.1 and 0.15 times this amount, the essential rule being to neutralize the acidity brought by the impregnating solutions, a small excess of base not modifying appreciably the properties of the catalyst.

The order of the impregnation operations is of appreciable importance and it is preferred to bring zinc oxide and the alkaline-earth metal oxide before the neutralizing element. The catalysts which are manufactured in the reverse order exhibit lower performances with respect to selectivity.

The impregnated catalyst is finally dried and roasted for example above 300° C.

The best catalysts have been obtained by use of the following operations in the order:

(1) Impregnation of the carrier (silica preferably containing 0.4–2% by weight of alkaline metal, expressed as $M_2O$) by means of an aqueous solution containing the zinc compound and the alkaline-earth metal compound. However distinct solutions may be used for each metal.
(2) Drying, at least partial, for example at about 60–100° C.
(3) Impregnation by means of an aqueous solution of the alkaline compound which is used to counterbalance the acidity of the previous solutions.
(4) Drying, for example at about 100–110° C.
(5) Calcination by heating, for example for 2–7 hours, preferably under air current, at a temperature of 350–700° C.

The operations No. 3 and 4 may be omitted if the impregnating solutions of the No. 1 are not acid.

The conditions of use of these catalysts are also of importance. In order to obtain high conversion rates and selectivities, the temperature will be chosen between 350 and 450° C., preferably between 370 and 420° C., for hourly feed rates of liquid cyclohexanol amounting to about 0.5 to 8 times the volume of catalyst, advantageously 1.5 to 5, with absolute pressures of 0.1–10 kg./cm.$^2$, preferably 1–2 kg./cm.$^2$. Hydrogen is preferably used at a rate of 0.2–5 moles per mole of alcohol.

The following non-limitative examples illustrate this invention:

EXAMPLE 1

A catalyst is prepared containing approximately 18% by weight of zinc oxide, 6% by weight of calcium oxide, 2% by weight of potash deposited on a silica containing 1% by weight of $Na_2O$.

There is used 200 cm.$^3$ of extrudates of silica with a density of 0.37, i.e. 74 g., their specific surface being 35 m.$^2$/g., the total porous volume 115 cm.$^3$ per 100 g. and the amount of $Na_2O$ being 1% by weight.

The following solution is prepared:

Zinc nitrate: $Zn(NO_3)_2 6H_2O$—65.8 g.
Calcium nitrate: $Ca(NO_3)_2$—17.6 g.
Distilled water—50 cm.$^3$ After dissolution, the volume is completed to 85 cm.$^3$ with distilled water, the total absorption volume of the 74 g. of silica extrudates being:

$$\frac{74 \times 115}{100} = 85 \text{ cm.}^3$$

The 200 cm.$^3$ of silica extrudates are impregnated with the 85 cm.$^3$ of the above solution, and the contact is maintained for 10 hours; at the end of the 10 hours, the extrudates have completely absorbed the solution.

The impregnated extrudates are then dried for 12 hours in an oven at 90° C. 75 cm.$^3$ of a solution containing 2 g. KOH are then used for impregnation in order to counter-balance the acidity brought by the solution of nitrates. The contact is maintained for 10 hours and the extrudates are then dried at 100–110° C. for 12 hours. The catalyst is then roasted for 5 hours at 450° C. in an air current.

After calcination the specific surface of the catalyst is 22 m.$^2$/g.

The catalyst then constitutes the catalyst C of Table I. It has the following composition:

| | Percent |
|---|---|
| ZnO | 17.6 |
| CaO | 5.8 |
| $K_2O$ | 1.4 |
| $Na_2O$ | 0.7 |
| $SiO_2$ | 74.5 |

These values have been determined by chemical analysis.

EXAMPLE 2

This example shows the influence, on the selectivity, of the inertness of the catalytic carrier.

Operating as in Example 1, three catalysts A, B and C are manufactured with 18% ZnO, 6% calcium oxide and 2% KOH deposited on silica extrudates with the same textural characteristics (specific surface of 35 m.$^2$/g., porous volume of 115 cm.$^3$ per 100 g.); however the $Na_2O$ amounts by weight differ:

Catalyst A: 0.15% $Na_2O$ with respect to carrier
Catalyst B: 0.5% $Na_2O$ with respect to carrier
Catalyst C: 1% $Na_2O$ with respect to carrier Pure cyclohexanol, obtained by hydrogenation of phenol, is passed over these three catalysts under the following conditions:

Temperature: 400° C.
Absolute pressure: 1.5 kg./cm.$^2$
Feed rate: 4 liters of liquid cyclohexanol per liter of catalyst per hour.
Molar ratio hydrogen/cyclohexanol at the inlet of the reaction vessel: 1.

The results are given in Table I, from which is can be seen that it is important to have a neutral carrier at the beginning of the catalyst manufacture.

TABLE I

| | Composition of the product (by weight) | | | | | |
|---|---|---|---|---|---|---|
| | Cyclohexanol, percent | Cyclohexanone, percent | Hydrocarbons, percent | Water, percent | Conversion, percent | Selectivity, percent |
| Catalyst: | | | | | | |
| A | 24 | 65.5 | 8 | | 76 | 86.3 |
| B | 25.4 | 73.1 | 1.2 | 0.3 | 74.6 | 98 |
| C | 26 | 73.9 | 0.1 | 0 | 74 | 99.8 |

EXAMPLE 3

This example shows the influence, on the selectivity, of the deposit of alkaline metal compound used to counter-balance the acidity of the impregnating solutions.

Operating as in Example 1, there is prepared 4 catalysts D, E, F and G containing approximately 18% ZnO and 6% CaO deposited on silica extrudates having the same textural characteristics and the same content of $Na_2O$, however the KOH amounts are varied.

Percent KOH by weight

| | |
|---|---|
| Catalyst D | 0.5 |
| Catalyst E | 1 |
| Catalyst F (identical to catalyst C) | 2 |
| Catalyst G | 5 |

Pure cyclohexanol is passed over these 4 catalysts under the operating conditions of Example 2.

The results are given in Table II.

TABLE II

| Catalysts: | Percent conversion | Percent selectivity |
|---|---|---|
| D | 75.5 | 97.5 |
| E | 74.3 | 98.7 |
| F | 74 | 99.8 |
| G | 70 | 99.9 |

It may be observed that the amount of alkaline metal compound with which the carrier is impregnated has some influence on the selectivity of the catalyst; however this influence is lower than that of the inertness of the carrier.

The optimal amount of alkaline metal compound is about 10–15% of the amount of ZnO; beyond 15%, the selectivity does not increase appreciably, however the catalytic activity decreases.

EXAMPLE 4

This example shows the influence of the textural characteristics of the carrier over the activity, selectivity and stability of the catalyst.

Three catalysts are manufactured, H, I and J, each containing 18% ZnO, 6% CaO and 2% KOH, deposited on silica extrudates, using the process of Example 1.

The specific surfaces of the 3 carriers are different:

|  | M.$^2$/g. |
|---|---|
| Catalyst H | 8 |
| Catalyst I | 35 |
| Catalyst J | 140 |

The amounts by weight of Na$_2$O in these three carriers are the same: 1%.

After impregnation and calcination, the respective specific surfaces of these 3 catalysts were the following:

|  | M.$^2$/g. |
|---|---|
| Catalyst H | 1 |
| Catalyst I (as catalyst C) | 22 |
| Catalyst J | 83 |

These three catalysts have been used with pure cyclohexanol.

The operating conditions and results are given in Table III (the pressure, in all cases is 1.5 atmospheres and the molar ratio H$_2$/cyclohexanol is 1):

EXAMPLE 5

This example shows the influence of the method of manufacture and particularly that the order of the impregnation operations has a big influence.

Pure cyclohexanol and hydrogen are passed over a catalyst containing 18% of ZnO, 6% of CaO and 2% of KOH deposited on silica extrudates having the following textural characteristics:

Specific surface—35 m.$^2$/g.
Total pore volume—115 T cm.$^3$/100 g.
Na$_2$O content by weight—1%

The catalyst is manufactured as in example 1, i.e. ZnO and CaO are deposited before KOH.

The operating conditions are those of Example 2.

The raw product issuing from the reaction zone has the following composition by weight:

|  | Percent |
|---|---|
| Cyclohexanol | 26 |
| Cyclohexanone | 73.9 |
| Hydrocarbons | 0.1 | which represents a conversion rate of 74% and a selectivity towards cyclohexanone of 99.8% (see catalyst C of Example 2).

After 20 hours in the same operating conditions, the product had the following composition by weight:

|  | Percent |
|---|---|
| Cyclohexanol | 26.5 |
| Cyclohexanone | 73.4 |
| Hydrocarbons | 0.1 | which represents a conversion rate of 73.5% and a selectivity toward cyclohexanone of 99.9%.

By way of comparison, the same reactants are passed under identical conditions over a catalyst containing 18% ZnO, 6% CaO and 2%KOH, deposited on the same carrier. The process for manufacturing the catalyst is different, since KOH is deposited before ZnO and CaO.

The resulting product had the following composition by weight:

|  | Percent |
|---|---|
| Cyclohexanol | 27 |
| Cyclohexanone | 71.4 |
| Hydrocarbons | 1.3 |
| Water | 0.3 | which corresponds to a conversion rate of 73% and a selectivity toward cyclohexanone of 97.8 % only.

TABLE III

| | Operating conditions | | | | |
|---|---|---|---|---|---|
| | Temperature, ° C. | V.v.h. | Working time | Percent conversion | Percent selectivity |
| Catalyst: | | | | | |
| H | 420 | 1 | 1 | 67 | 99.8 |
| | | | 20 | 66.3 | 99.8 |
| I | 400 | 4 | 1 | 74 | 99.8 |
| | | | 20 | 73.5 | 99.9 |
| J | 380 | 4 | 1 | 79 | 99.8 |
| | | | 20 | 78.8 | 99.8 |

NOTE.—V.v.h.=volume of liquid cyclohexanol per volume of catalyst and per hour.

It may be observed that:

(a) the selectivities and stabilities of the 3 catalysts are good.
(b) the activity, i.e. the conversion rate, increases with the specific surface of the catalyst.

Industrially the catalyst having a large specific surface will be preferred since it allows the use of higher feed velocities, or working at lower temperatures.

After 10 hours under the same operating conditions, the resulting product had the following composition:

|  | Percent |
|---|---|
| Cyclohexanol | 32 |
| Cyclohexanone | 65 |
| Hhydrocarbons | 2.4 |
| Water | 0.6 | which corresponds to a conversion rate of 68% and a selectivity of 95.5%.

Thus, in order to obtain a very selective and stable catalyst it is necessary to follow the operating steps of Example 1.

EXAMPLE 6

This example shows the influence of the amounts of ZnO and CaO on the activity, selectivity and stability of the catalyst.

Three catalysts are prepared, K, L and M, containing varied amounts of ZnO, deposited on silica extrudates the textural characteristics and $Na_2O$ content of which are the same (specific surface 35 m.$^2$/g.; porous volume 115 cm.$^3$/100 g.; $Na_2O$: 1%).

| Catalyst: | ZnO, percent | CaO, percent | KOH, percent |
|---|---|---|---|
| K | 9 | 3 | 1 |
| L | 18 | 6 | 2 |
| M | 24 | 8 | 2.7 |

After impregnation and roasting, the specific surfaces of these 3 catalysts were the following:

M.$^2$/g.
Catalyst K _____ 29
Catalyst L (as catalyst C) _____ 22
Catalyst M _____ 14

Pure cyclohexanol has been passed over these 3 catalysts under the operating conditions of Example 2.

The results are given in Table IV.

TABLE IV

| Catalysts: | Times (hours) | Percent conversion | Percent selectivity |
|---|---|---|---|
| K | 1 | 71 | 99.7 |
|   | 20 | 66 | 99.8 |
| L | 1 | 74 | 99.8 |
|   | 20 | 73.5 | 99.9 |
| M | 1 | 68 | 99.9 |
|   | 20 | 67.6 | 99.9 |

It may be concluded:

that the selectivity of the 3 catalysts is quite good that the initial activity of catalyst K is pretty good; however its stability is bad. This good initial activity could be probably ascribed to the rather large specific surface of the catalyst that the stability of catalysts L and M is quite good that the initial activity of catalyst M is lower; the lower specific surface of this catalyst is probably responsible of this lower activity.

Thus an optimal amount of ZnO is preferably used; this is between 15 and 20%.

EXAMPLE 7

Following the general process of Example 1, however using zinc acetate and calcium acetate instead of the corresponding nitrates, catalysts are obtained which exhibit a somewhat increased activity.

These catalysts have been used for 3,600 hours without noticeable deactivation.

EXAMPLE 8

The steps of Example 1 are followed, except that zinc and calcium citrates are used instead of the corresponding nitrates. The catalyst is somewhat more active and selective than the reference catalyst.

EXAMPLES 9, 10 AND 11

Example 1 is repeated except that barium, strontium and magnesium carbonates respectively are substituted for calcium nitrate, so that the weights of corresponding oxides, after impregnation and calcination, amount to 6% of the weight of the catalyst.

The resulting catalysts are somewhat more active than the reference catalyst.

EXAMPLES 12-13

Example 1 is repeated except that zinc and calcium tartrates, on the one part, zinc and calcium lactates, on the other part, are substituted for the corresponding nitrates. The resulting catalysts are slightly more selective than the reference catalyst.

EXAMPLE 14

Two catalysts N and O are prepared, which are identical to catalyst C, except that the amounts of CaO are respectively 3% and 9%.

Under the experimental conditions of Example 2, the following results have been obtained:

| Catalyst: | Percent CaO | Time (hours) | Percent conversion | Percent selectivity |
|---|---|---|---|---|
| N | 3 | 1 | 77 | 98.5 |
|   |   | 20 | 73 | 98.9 |
| O | 9 | 1 | 70 | 99.9 |
|   |   | 20 | 70.3 | 99.9 |
| C | 6 | 1 | 74 | 99.8 |
|   |   | 20 | 73.5 | 99.9 |

I claim:

1. A catalyst containing silica, zinc oxide, an alkaline-earth metal oxide and an alkaline metal compound prepared by admixing silica containing 0.2-5% by weight of an alkaline metal compound selected from the group consisting of oxides, hydroxides and carbonates, expressed as $M_2O$ where M is the alkaline metal, with aqueous solutions of a zinc compound and an alkaline earth metal compound, said alkaline earth metal compound being selected from the group consisting of nitrates, acetates, citrates, lactates, tartrates, laurates and oleates, the weight of the zinc compound, expressed as ZnO, amounting to 2-50% with respect to the catalyst, the weight of the alkaline-earth metal compound, expressed as oxide amounting to 0.5-30% with respect to the catalyst, drying the resulting mixture and roasting the latter at 350°-700° C.

2. A catalyst as claimed in claim 1, the weight of said alkaline metal compound being about 10/15% of the amount of said zinc oxide compound.

3. A catalyst as claimed in claim 1, wherein the weight of the zinc compound, expressed as ZnO, is between 8-25% with respect to said catalyst, the weight of the alkaline-earth metal compound, expressed as oxide is between 15-50% with respect to said zinc oxide the weight of said alkaline metal compound is 0.4 to 2% with respect to said catalyst.

4. A catalyst as claimed in claim 1, wherein the silica exhibits a specific surface higher than 15 m.$^2$/g.

5. A catalyst as claimed in claim 1, wherein the silica exhibits a porous volume of 0.8-1.3 cm.$^3$/g. and a specific surface of 15-300 m.$^2$/g.

6. A catalyst as claimed in claim 1, wherein the amount of zinc oxide is 15-20% by weight.

7. A catalyst as claimed in claim 1, consisting of zinc oxide, calcium oxide and potassium hydroxide incorporated into a silica containing sodium oxide.

8. A catalyst according to claim 1, wherein the silica is an activated silica exhibiting a specific surface of 15-300 m.$^2$/g. and an amount of alkaline metal compound between 0.4 and 2% by weight, measured as $M_2O$.

9. A catalyst according to claim 1, wherein the silica containing said alkaline metal compound is first impregnated with an aqueous solution containing the zinc compound and the alkaline-earth metal compound, then dried, impregnated with an aqueous solution of a second alkaline metal compound selected from the group consisting of carbonates, hydroxides, and oxides, said second alkaline metal compound being the same as or different than said alkaline metal compound and then dried and roasted.

10. A catalyst according to claim 1, wherein the zinc and alkaline earth metal compounds are impregnated as aqueous solutions of nitrates, acetates, citrates, lactates, tartrates, laurate or oleates.

11. A catalyst according to claim 1, wherein said alkaline metal compound is sodium oxide, potassium oxide, sodium hydroxide, potassium hydroxide, lithium hydroxide, sodium carbonate, potassium bicarbonate, rubidium carbonate or cesium carbonate, and said alkaline earth metal compound is a compound of magnesium, calcium, barium or strontium.

12. A catalyst according to claim 1, wherein said alkaline metal compound is sodium oxide, said zinc compound is zinc nitrate, and said alkaline earth metal compound is calicum nitrate.

13. A catalyst according to claim 9, wherein said alkaline metal compound is sodium oxide, potassium oxide, sodium hydroxide, potassium hydroxide, lithium hydroxide, sodium carbonate, potassium bicarbonate, rubidium carbonate or cesium carbonate, and said alkaline earth metal compound is a compound of magnesium, calcium, barium or strontium.

14. A catalyst according to claim 9, wherein said alkaline metal compound is sodium oxide, said zinc compound is zinc nitrate, said alkaline earth metal compound is calcium nitrate, and said second alkaline metal compound is potassium hydroxide.

15. A catalyst according to claim 9, wherein said second alkaline metal compound is potassium hydroxide.

References Cited

UNITED STATES PATENTS

| 2,822,398 | 2/1958 | McClure | 252—457X |
| 1,965,072 | 7/1934 | Dreyfus | 260—596 |

FOREIGN PATENTS

| 1,445,100 | 5/1966 | France | 252—457 |
| 1,380,733 | 10/1964 | France | 260—586 |
| 776,262 | 6/1957 | Great Britain | 260—586 |

DANIEL E. WYMAN, Primary Examiner

C. F. DEES, Assistant Examiner

U.S. Cl. X.R.
260—586